(12) United States Patent
Wedemeyer et al.

(10) Patent No.: US 11,446,868 B2
(45) Date of Patent: Sep. 20, 2022

(54) ASSEMBLY AND METHOD FOR CREATING A 3D STRUCTURE

(71) Applicant: LAEMPE MOESSNER SINTO GmbH, Barleben (DE)

(72) Inventors: Frank Wedemeyer, Zell im Wiesental (DE); Rudolf Wintgens, Schopfheim (DE)

(73) Assignee: LAEMPE MOESSNER SINTO GmbH, Barleben (DE)

( * ) Notice: Subject to any disclaimer, the term of this patent is extended or adjusted under 35 U.S.C. 154(b) by 53 days.

(21) Appl. No.: 16/639,483

(22) PCT Filed: Aug. 14, 2018

(86) PCT No.: PCT/DE2018/000238
§ 371 (c)(1),
(2) Date: Feb. 14, 2020

(87) PCT Pub. No.: WO2019/034192
PCT Pub. Date: Feb. 21, 2019

(65) Prior Publication Data
US 2021/0031448 A1 Feb. 4, 2021

(30) Foreign Application Priority Data
Aug. 17, 2017 (DE) .......................... 102017007785.1

(51) Int. Cl.
*B29C 64/214* (2017.01)
*B33Y 30/00* (2015.01)
(Continued)

(52) U.S. Cl.
CPC .......... *B29C 64/214* (2017.08); *B29C 64/141* (2017.08); *B29C 64/188* (2017.08);
(Continued)

(58) Field of Classification Search
CPC ... B29C 64/214; B29C 64/188; B29C 64/141; B29C 64/153; B29C 64/205; B33Y 10/00; B33Y 30/00; B33Y 40/00
(Continued)

(56) References Cited

U.S. PATENT DOCUMENTS 5,204,055 A 4/1993 Sachs et al.
5,387,380 A 2/1995 Cima et al.
(Continued)

FOREIGN PATENT DOCUMENTS

DE 69330495 T2 12/1993
DE 10216013 B4 10/2003
(Continued)

OTHER PUBLICATIONS

International Search Report, PCT/DE2018/000238, dated Dec. 21, 2018.

*Primary Examiner* — Susan D Leong
*Assistant Examiner* — Xinwen Ye
(74) *Attorney, Agent, or Firm* — Cohen & Hildebrand, PLLC (57) ABSTRACT

An assembly and method for creating a 3D structure. An improved compression of particulate construction material to be applied in layers, and as for increased speed in the forming of the individual layers is provided. A compressor element (2) has a blade with cutting edge arranged for compressing particulate construction material to be applied in layers. The cutting edge width is in a range between about 0.1 and about 3 times the diameter of a particle of the particulate construction material. The compression of construction material occurs with a compressor element (2) having a blade with a cutting edge and arranged in a compressor assembly (1). The width of the cutting edge is in a range between about 0.1 and about 3 times the diameter of a particle. The compressor element (2) is moved in a linear movement direction (12) by a drive element (3).

25 Claims, 5 Drawing Sheets

(51) Int. Cl.
*B29C 64/188* (2017.01)
*B29C 64/141* (2017.01)
*B33Y 10/00* (2015.01)
*B33Y 40/00* (2020.01)

(52) U.S. Cl.
CPC ............... *B33Y 10/00* (2014.12); *B33Y 30/00* (2014.12); *B33Y 40/00* (2014.12)

(58) Field of Classification Search
USPC .................................................. 264/10, 109
See application file for complete search history.

(56) References Cited

U.S. PATENT DOCUMENTS

| | | | | |
|---|---|---|---|---|
| 6,408,673 | B1* | 6/2002 | Korner | ..................... B21J 9/022 |
| | | | | 100/257 |
| 7,879,393 | B2 | 2/2011 | Edener et al. | |
| 2004/0011456 | A1* | 1/2004 | Futamura | ................ B21D 35/00 |
| | | | | 156/256 |
| 2006/0105102 | A1 | 5/2006 | Hochsmann et al. | |
| 2010/0192787 | A1* | 8/2010 | Onishi | .................... B30B 15/14 |
| | | | | 100/46 |
| 2014/0227123 | A1* | 8/2014 | Gunster | ................. B33Y 10/00 |
| | | | | 419/1 |
| 2017/0291373 | A1* | 10/2017 | Hara | ...................... B33Y 30/00 |
| 2017/0326792 | A1 | 11/2017 | Paternoster et al. | |
| 2018/0333913 | A1* | 11/2018 | Lin | ....................... B29C 64/264 |

FOREIGN PATENT DOCUMENTS

| | | |
|---|---|---|
| DE | 112013006029 T5 | 9/2015 |
| DE | 102014222129 A1 | 4/2016 |
| EP | 0431924 A2 | 6/1991 |
| EP | 1494841 B1 | 1/2005 |
| WO | 2002083323 A2 | 10/2002 |
| WO | 03086726 A1 | 10/2003 |
| WO | 2016030375 A2 | 3/2016 |

* cited by examiner

ASSEMBLY AND METHOD FOR CREATING A 3D STRUCTURE

BACKGROUND OF THE INVENTION

(1) Field of the Invention

The invention relates to an assembly for creating a 3D structure, including a device for compressing a particulate construction material applied in layers, and a drive to impart a controlled movement on the device.

The invention also relates to a process for creating a 3D structure, wherein a layer of particulate construction material to be applied on a construction site is provided, which is at least partially compressed, and wherein the 3D structure is created in layers by a partial physical or chemical hardening process or a melting process.

(2) Description of Related Art

It is known to employ so-called 3D printing or a so-called 3D printing process for the production of individual or mass-produced components, workpieces or molds. With such printing methods, three-dimensional components or workpieces are prepared in a layered construction. The construction is carried out under computer control from one or more liquid or solid materials according to predetermined sizes and shapes. Specifications for the components or workpieces to be printed can be provided, for example, by so-called computer-aided design (CAD) systems.

When printing the 3D structures, physical or chemical hardening processes or a melting process take place. Synthetic materials, synthetic resins, ceramics and metals are employed as materials for such 3D printing process.

Various manufacturing process sequences are known when implementing 3D printing processes.

However, several of these procedural sequences include the procedural steps shown below by way of example:
- Applying particulate construction material, also referred to as particulate material, over a partial or full surface of a so-called construction site in order to form a layer of non-solidified particulate material;
- Selectively solidifying the applied layer of non-solidified particulate construction material in predetermined partial areas, for example, by selective compressing, printing or application of treating agent such as a binder, or use of a laser;
- Repeating the previous method steps in a further layer level for the layer-by-layer construction of the component or workpiece. For this purpose, the component or workpiece which is to be built up on the construction site layer-by-layer or printed, may be lowered together with the construction site by a layer plane or a layer thickness, or the 3D printing apparatus may be raised by a layer plane or layer thickness with respect to the construction site, before a new layer is applied partially or over the entire surface;
- Subsequent removal of loose, non-solidified particulate construction material, which surrounds the finished component or workpiece.

From WO 02/083323, a method and an apparatus for applying fluids, in particular particulate material, on an area to be coated is known, wherein the fluid is applied onto the area to be coated in front of a blade, as seen in a forward movement direction of the blade, whereafter the blade is moved over the applied fluid. The described method is characterized in that the blade performs an oscillation resembling a rotary movement.

When the process operates such that excess fluid is applied on the area to be coated, then due to the oscillation of the blade, which oscillates with a rotary movement, the excess fluid is homogenized in a roller of fluid or particulate material formed in front of blade by the forward movement of the blade, as viewed in the forward moving direction of the blade. Possible cavities between the individual lumps of particles can then be filled, while larger lumps of particulate material are broken up by the movement of the roller. The particulate material is homogenized in the roller. A small fraction of this particulate material disposed in front of the blade is pulled into a gap under the blade, where it is compressed and then applied as a uniform layer.

The fluid or particulate material may be applied in the region before the oscillating blade, as viewed in the forward movement direction of the blade, from a reservoir, for example via a conveyor belt.

The rotary movement of the blade occurs about a pivot axis which is located above the region to be coated, as viewed in the build-up direction of the fluid. Particularly good results were achieved with the method, when the vibration takes place with a rotary movement, with the rotation angle being in a range of 0.1 to 5°.

The described device is particularly suitable for applying particulate material provided with a binder.

A method and a device for applying fluids are known from EP 1 494 841 B1. The problem to be solved is to provide a device and a method for using the device, which further improves the distribution of the fluid, which is applied only in a small quantity on a region to be coated.

A downwardly open hopper may be suspended in front of the coating blade, which is rigidly connected to the blade and thus oscillates with the blade. The hopper carries the particulate material supply for at least one coating passage over the entire length of the construction site. Upon operation of the oscillating mechanism of the hopper, the particulate material in the hopper is fluidized and flows out of the open bottom of the hopper in front of the blade. The hopper is hence able to carry a much larger quantity of material than is necessary for the current layer.

It is also disclosed that the employed oscillating blade is preferably driven by an eccentric cam that is rotationally fixed on the drive motor shaft. The force may be transmitted from the eccentric cam to the oscillating blade in a positively locking manner, i.e. by applying a roller bearing directly on the eccentric cam, or by frictional transmission on the eccentric cam by way of a spring-biased roller.

This method is also particularly suitable for applying particulate material having a binder.

A coater assembly for a 3D printer and a method for applying two layers of particulate construction materials are known from WO 2016/030375 A2.

The coater assembly comprises a coater comprising a container defining an inner cavity for receiving particulate construction material, which terminates in an opening for discharging the particulate construction material, and a blade forming a downwardly facing wiping surface, wherein the blade is configured to sweep with the wiping surface over construction material exiting the opening, thereby leveling and or densifying the dispensed particulate material.

The coater assembly also includes an adjustment device, which is configured to variably set an inclination angle of the wiping surface.

A method and an apparatus for applying paste-like media on a support for producing a 3D component are known from DE 693 30 495 T2.

The problem to be solved is to create a method for applying paste-like media on a support, which can increase the process reliability in stencil printing and reduce the error rates. A higher processing speed can also be achieved.

To achieve this object, an application pattern may be defined by a mask arranged on the support and the paste-like medium may be applied with a doctor blade, whereby the paste-like medium is pressed into recesses left open in the mask.

Also disclosed is that oscillations are introduced in the doctor blade by an actuator, which are then transmitted to the paste-like material when the doctor blade advances. The paste-like material then flows more readily into the openings or recesses of the mask or stencil, thus completely filling them with the paste-like medium. The improvement achieved with the application of vibrations can be explained in that with the increase in temperature of the medium due the introduced energy, the rolling friction of the paste-like particles is reduced and the viscosity is apparently also reduced.

Since only the medium abutting the scraper is supplied with vibrational energy, the viscosity is apparently reduced only here. As a result, the medium flows better into the openings of the stencil and is deposited on the substrate in the form of the densest ball packing. Overall, therefore, a higher processing speed and an increased print quality is attained with a smaller supply of paste-like medium on the stencil.

A method and an apparatus for applying fluids, in particular particulate material, on a region to be coated are known from DE 102 16 013 B4.

It is therefore the object to provide a device and a use of the device, with which an even better distribution of the fluid, which is applied only in a small amount on a region to be coated, can be achieved.

This object is attained by applying the fluid on the area to be coated in front of a blade, as viewed in the direction of forward movement of the blade, and by then moving the blade over the applied fluid. The blade should hereby perform an oscillation, with the fluid being supplied from a downwardly open container, i.e. a container which is open toward the region to be coated, and which swings with the blade. The oscillation of the blade resembles a rotary movement.

It is also disclosed that an eccentric cam for driving the blade is provided and that a force transmission from the eccentric cam to the blade can take place in a positive or non-positive manner.

The disadvantages of this known prior art are that a movement, preferably a kind of rotary movement, for example by means of an eccentric cam, must generally be imparted on the blades or oscillating blades. This requires a corresponding drive, such as an electric motor and necessary mechanical components for generating or implementing the necessary movement patterns, which increases both the effort and the space required for the setup. In addition, the production of such assemblies becomes more complicated, which also increases the cost for the production of such assemblies.

Due to the necessary mechanics and partially coupling to a reservoir, the maximum achievable frequency of such assemblies and hence their processing or compression rate are also limited. Moreover, feeding and compaction of the material are directly related and influence each other. Independently separating feeding and compaction is therefore not possible.

Executing an oscillation with a blade has another drawback in that, for example, a force is introduced over a comparatively large area of the fluid to be compressed. As a result, a force can be applied simultaneous with the oscillation of the blade to areas of the fluid that have already been compressed as well as to areas that have not yet been compressed. This is expected to diminish the quality of the compression.

BRIEF SUMMARY OF THE INVENTION

It is therefore an object of the invention to provide an arrangement and a method for creating a 3D structure having multiple layers, while improving compaction of a particulate construction material that is applied layer-by-layer with a high surface quality and higher speed when building up the individual layers.

A compressor element is designed as a blade having at least one cutting edge. With this blade-like configuration of the compressor element, the width of a cutting edge may be in a range between 0.1 times to 3 times the diameter of a particle of the particulate construction material or particulate material. The width of the blade is hereby determined at the point or the end of the cutting edge, which comes in contact with the particles of the particulate construction material or particulate material during a compression process.

Preferably, the width of a cutting edge of the blade in a range of between 0.3 times and 2 times the diameter of a particle of the particulate construction material or particulate material. Particularly preferably, the width of a cutting edge is in a range between 0.5 times and 1 times the diameter of a particle of the particulate construction material or particulate material.

The size or the diameter of a particle of the particulate construction material or particulate material is usually in a range between 0.1 and 0.2 mm. Particularly preferably, the size of a particle of the particulate construction material or particulate material has a diameter of 0.18 mm.

With the design of the width of a blade of the compressor element with the aforedescribed dimensions, a deterioration of the quality of compression can be avoided because a force is introduced to the surface of the particulate construction material or particulate material over a limited, very narrow area, which is in the same size range as a single particle or just a few particles of the particulate construction material or particulate material.

With the invention, adverse effects on adjacent, already compacted particles are practically eliminated, provided that, for example, the compressor element performs a uniform motion over the construction site and a cutting edge is dimensioned accordingly. This considerably improves the quality of the compaction of the applied layer of a particulate construction material or particulate material.

According to the invention, several of these compressor elements, each having a corresponding cutting edge, may be arranged in a compressor assembly. Such compressor elements may for example be thin strips of a metallic material, which has the aforedescribed knife-shaped design with a corresponding cutting edge.

The for example three knife-shaped compressor elements arranged in a compressor assembly can be arranged, for example, closely spaced and parallel to each other, so that penetration of the particulate construction material between these compressor elements is prevented.

The compressor elements are each connected to their dedicated drive means and are moved in a linear fashion, i.e. a so-called back and forth movement, by their respective drive means.

The drive means may be driven electrically. Alternatively, the drive means may also be operated electromagnetically, for example, by using a coil generating a magnetic field, or piezoelectrically. Other alternatives may also be, for example, positively driven connecting rod drives. The movement produced by the respective drive means is transmitted to the associated compressor element, which is for this purpose fixedly connected with the drive means.

The compressor elements of a compressor assembly may be arranged, for example, parallel to one another and at an angle of 90 degrees in relation to the construction site, i.e. in relation to the direction of the face facing the compressor elements, hereinafter simply referred to as surface, of the applied layer of particulate construction material or particulate material.

In an alternative embodiment, the compressor elements of a compressor assembly may be arranged parallel to one another and at an angle different from 90 degrees with respect to the construction site. In this way, the compressor elements can be aligned at an angle in relation to the construction site. The deviation from the surface normal above the construction site may be, for example, 0.1 degrees to 15 degrees.

The length of a compressor element having a blade with a cutting edge can extend over the entire width of the construction site. The dimensions of a compressor element can be specified, for example, as having a length of 500 mm, a width of 3 mm and a height of 30 mm.

The compressor assembly with its compressor elements may be placed above a construction site, wherein the compressor assembly is movably arranged above the construction site and can be moved, as is typical in the prior art, above the construction site at least in an X and a Y direction. To enable the layered structure, the compressor assembly may also be movable in the Z-direction above the construction site, i.e. away from or towards the construction site. Alternatively, the construction site may also be arranged to be movable in the Z direction. That is, the spacing between the construction site and the compressor assembly can be increased or reduced.

In another embodiment of the compressor assembly, the compressor elements may be arranged at different angles to one another. For example, three compressor elements may be arranged such that the middle compressor element is arranged perpendicularly (90 degrees) above the construction site, while a first adjacent compressor element has an angle greater than 90 degrees and a second adjacent compressor element has an angle smaller than 90 degrees. For example, the angles can be 89, 90 and 91 degrees, or 88, 90 and 92 degrees, wherein the ends of the compressor elements or knives provided for compressing the particulate construction material diameter are arranged in close proximity to each other above the construction site.

In order to optimize the action of the knife-shaped compressor elements on the surface of the particulate construction material during compaction of the construction material at the appropriate places, the compressor elements are provided with at least one structure. Such a structure is disposed at the end of the compressor element that comes into contact with the particulate construction material.

Such a structure can, for example, have a concave shape. Alternatively, a structure can also have a convex, wavy or saw-tooth shape, but is not limited to the mentioned shapes of the structure. The shape of the structure can be adapted by a skilled person to particular specifications and circumstances.

A compressor element may also have two structures at its respective end. The shape and size of the two structures may be identical or different. These structures produce cutting edges at the ends of the compressor elements, which come into contact with the particulate construction material during compaction, hereinafter also referred to as contact points, while other regions at the end of the compressor element no longer contact the construction material.

With a compressor element having a blade with at least one cutting edge, one cutting edge may be formed with a, for example, V-shaped beveled edge, as is typical for a knife, at the end of the compressor element. In one alternative embodiment, a cutting edge or multiple cutting edges may be formed on a compressor element at the end of the compressor element by applying one or more structures at the end of the compressor element that have, for example, a concave shape. Such a structure may extend in a longitudinal extension of the compressor element. When several cutting edges are formed on a compressor element, each cutting edge has a width with the above-described dimensions, so that during compression contact, i.e. a force applied to the surface of particulate construction material or particulate material, is always limited to a very narrow region having a size of the order of a single particle or a few particles of the particulate construction material or particulate material.

The compressor elements can be moved independently of each other, under control of their respective drive means. Thus, the compressor elements can move in an identical manner or in a different manner.

For example, a first compressor element may be moved in the direction of the construction site, while at the same time a second compressor element is moved in a direction away from the construction site or vice versa.

The back and forth movement of each drive means and thus each compressor element may be controlled with its own frequency. In addition to the frequency, the amplitude, i.e. the excursion of the back and forth movement, may also be set individually.

Furthermore, the shape of a waveform of a control voltage controlling the drive means, such as a sine wave, can also be set. The choice of the waveform commensurately influences the shape of the movement of the compressor element. Useful waveforms may also be, for example, a sawtooth waveform or a meandering waveform.

The process of dispensing the particulate construction material and compacting the particulate construction material may be carried out separately so as to eliminate interference between the two processes.

The features and advantages of this invention discussed above will become more apparent and appreciated after careful consideration of the following detailed description of the preferred, but non-limiting exemplary embodiments of the invention in conjunction with the appended drawings, which show in:

BRIEF DESCRIPTION OF THE DRAWINGS

FIG. 6b: an enlarged view of the region of the ends of the compressor elements according to FIG. 6a.

DETAILED DESCRIPTION OF THE INVENTION

Figure 1:
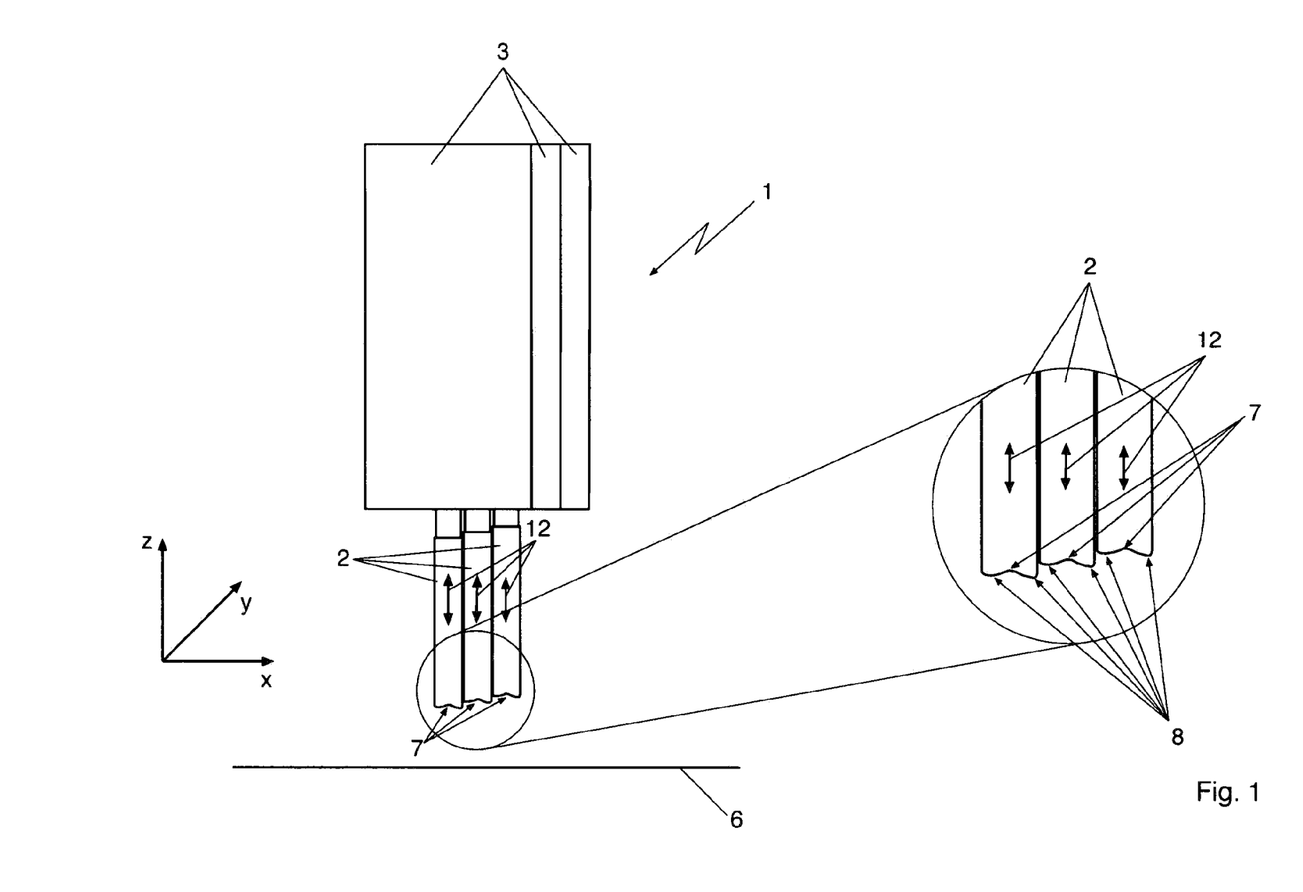
FIG. 1: an embodiment of the according to the invention with three compressor elements.

FIG. 1 shows a compressor assembly 1 according to the invention, which is arranged above a surface of a construction site 6. The compressor assembly 1 is arranged to be movable at least in an X direction and a Y-direction across the construction site. 6 The necessary mechanism and a control unit controlling the movement are not shown in FIG. 1. Customary prior art solutions can be used for this purpose. To ensure that a layered structure of the 3D model is created, the compressor assembly 1 may also be movable in a Z-direction. Alternatively, the construction area can also be designed to be movable in an X direction, a Y direction and optional in a Z direction.

The compressor assembly 1 has three drive means 3. Each of the drive means 3 may be connected to a respective compressor element 2 which can thus be individually controlled or moved.

With this possibility of a mutually independent individual control of the compressor elements 2, the compressor elements 2 can be controlled and thus moved in an identical fashion, or controlled and also moved in a different fashion.

The double arrows in the compressor elements 2 shown in FIG. 1 indicate the movement directions 12 of the respective compressor element 2, which is moved linearly, or along a longitudinal axis, in a so-called back and forth movement. The exemplary movement directions 12 of the compressor elements 2 depicted in FIG. 1 are parallel to each other. When the present description refers to a special point in time of the movement of a compressor element 2, the current movement direction 12 is only depicted with a single arrow, showing the direction in which the compressor element 2 is moving at that point in time.

The compressor elements 2 depicted in FIG. 1 are shown at different positions on their possible movement paths. This is indicated by the different lengths of the compressor elements 2 and by the different distances between the ends 7 of the compressor elements 2 from the construction site 6.

Contact points 8, which come in contact with the particulate construction material that is applied as a thin layer at least partially on the construction site 6, are formed at the end 7 of each compressor element 2. To better identify the design of the ends 7 of the compressor elements 2 with the contact points 8, these are shown in addition in FIG. 1 in an enlarged diagram similar to a magnifying glass By moving the compressor element 2 sufficiently quickly in the directions shown by the double arrows, i.e. at a high frequency, the particulate construction material can be compressed at the locations provided for this purpose. This compression of the particulate construction material at the provided locations in a first layer is carried out while the compressor assembly 1 is moved above the construction site 6, for example in the X direction. If the compressor elements 2 are controlled and displaced sufficiently fast, i.e. at a high frequency, then a very good and fast compression of the particulate construction material is achieved. The formation or design of a layer and thus of the entire 3D structure becomes possible in a shorter time compared to conventional 3D printing processes. The reason for the increased rate of production of a 3D structure is that when the compressor elements move only linearly, mechanical components, for example for steering or deflection of a movement, can be dispensed with.

Conventional means for the storage and application of the particulate construction material known in the art can be used in conjunction with the invention. Moreover, the use of a binder is also possible and contemplated.

Figures 2A, 2B:
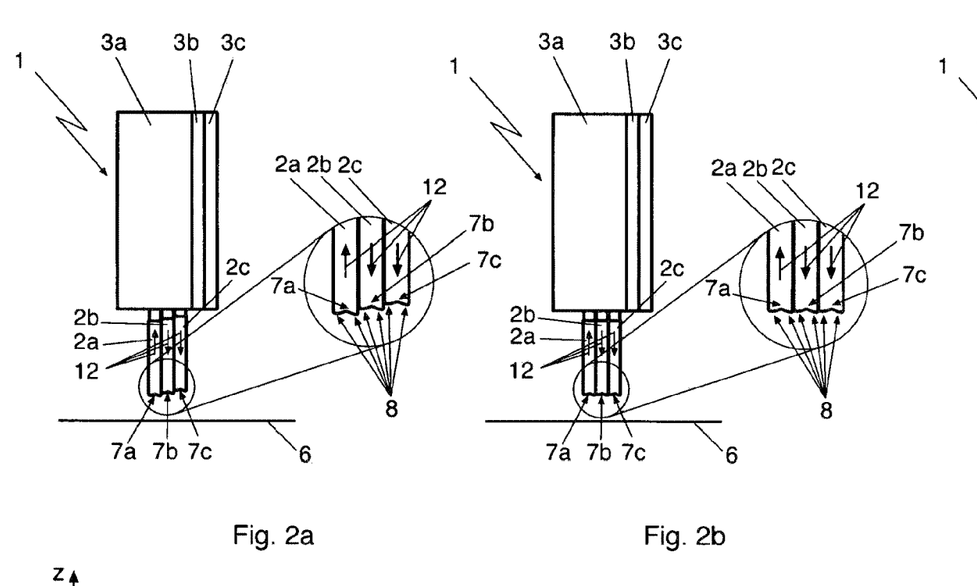
FIGS. 2a, 2b, 2c: an illustration of various movements of the compressor assembly of FIG. 1, FIG. 3 a partial enlarged view of the ends of the compressor elements which each have two structures.
Figure 2C:
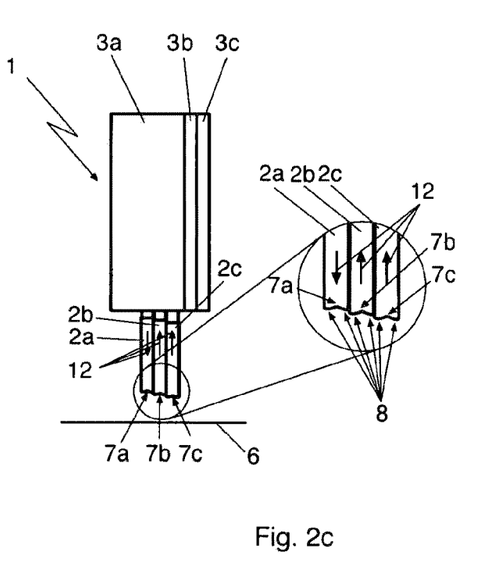

FIGS. 2a, 2b and 2c show the compressor assembly 1 of FIG. 1 with, for example, three compressor elements 2 in various operating states. To distinguish the individual compressor elements, the compressor elements are designated with the reference numerals 2a for the first compressor element 2a, 2b for the second compressor element 2b, and 2c for the third compressor element 2c.

FIG. 2a shows a first operating state, wherein the first compressor element 2a has reached its maximum excursion, i.e. its shortest distance from the construction site 6, and the particulate construction material (not shown in FIG. 2) has been compressed accordingly in the region between the contact points 8 of the first end 7a of the first compressor element 2a and the construction site 6. To better identify the design of the ends 7a, 7b and 7c of the compressor elements 2a, 2b and 2c, these are shown in FIGS. 2a, 2b and 2c on an enlarged scale similar to a magnifying glass In the illustrated operating state, the first drive 3a moves the first compressor element 2a in a direction where the distance between the first compressor element 2a and the construction site 6 continually increases. This movement direction 12 is illustrated by the upward arrow in relation to the drive means 3a. At the same time, the second compressor element 2b is moved by the second drive means 3b, and the third compressor element 2c is moved by the third drive means 3c in the direction of the construction site 6. As indicated, the second compressor element 2b has a smaller distance from the construction site 6 than the third compressor element 2c. Thus, it can be assumed that the contact points 8 of the second end 7b reach the particulate material on the surface of the construction site 6 next and that hence the particulate construction material is compacted at the contact locations 8 before the contact locations 8 of the third end 7c of the third compressor element 2c execute their compression process.

During the point-by-point compression of the particulate construction material on the surface of the construction site 6 by the three compressor elements 2a, 2b and 2c, the construction site 6 is moved in the X and/or Y direction. Alternatively, the compressor assembly 1 may be moved over the construction site 6.

FIG. 2b shows a second operating state, wherein the first compressor element 2a has moved farther away from the construction site 6, while the second and the third compressor elements 2b and 2c have continued their movement in the direction of the construction site 6. The movement directions 12 of the compressor elements are thus identical to those in the FIGS. 2a and 2b. The contact points 8 of the second end 7b of the second compressor element 2b have reached the particulate construction material on the surface of the construction site 6 and compress the particulate construction material at the contact points 8 accordingly.

After the end 7b of the second compressor element 2b has executed the compression process, the movement direction 12 of the second compressor element 2b, which is moved by the second drive means 3b, is reversed, so that the distance of the second end 7b to the construction site 6 increases. At the same time, the first compressor element 2a and the third compressor element 2c continue their movement in the respective unchanged movement direction 12.

FIG. 2c shows a third operating state, wherein the contact points 8 of the third end 7c of the third compressor element 2c have reached the particulate construction material on the surface of the construction site 6 and compress the particulate construction material at the contact points 8 accordingly. After this compression operation, the movement direction 12 of the third compressor element 2c, which is moved by the third drive means 3c, is reversed, whereby the distance of the third end 7c to the construction site 6 is increased. At this time, the second compressor element 2b continues its movement away from the construction site 6. The first compressor element 2a has reached its maximum distance to the construction site 6 and reverses its movement direction 12, moving now again toward the construction site 6 and thus reducing the distance between the first end 7a of the first compressor element 2a and the construction site 6. This aforedescribed operating condition is illustrated in the FIG. 2c with the respective arrows at the compressor elements 2a, 2b and 2c.

Figure 3:
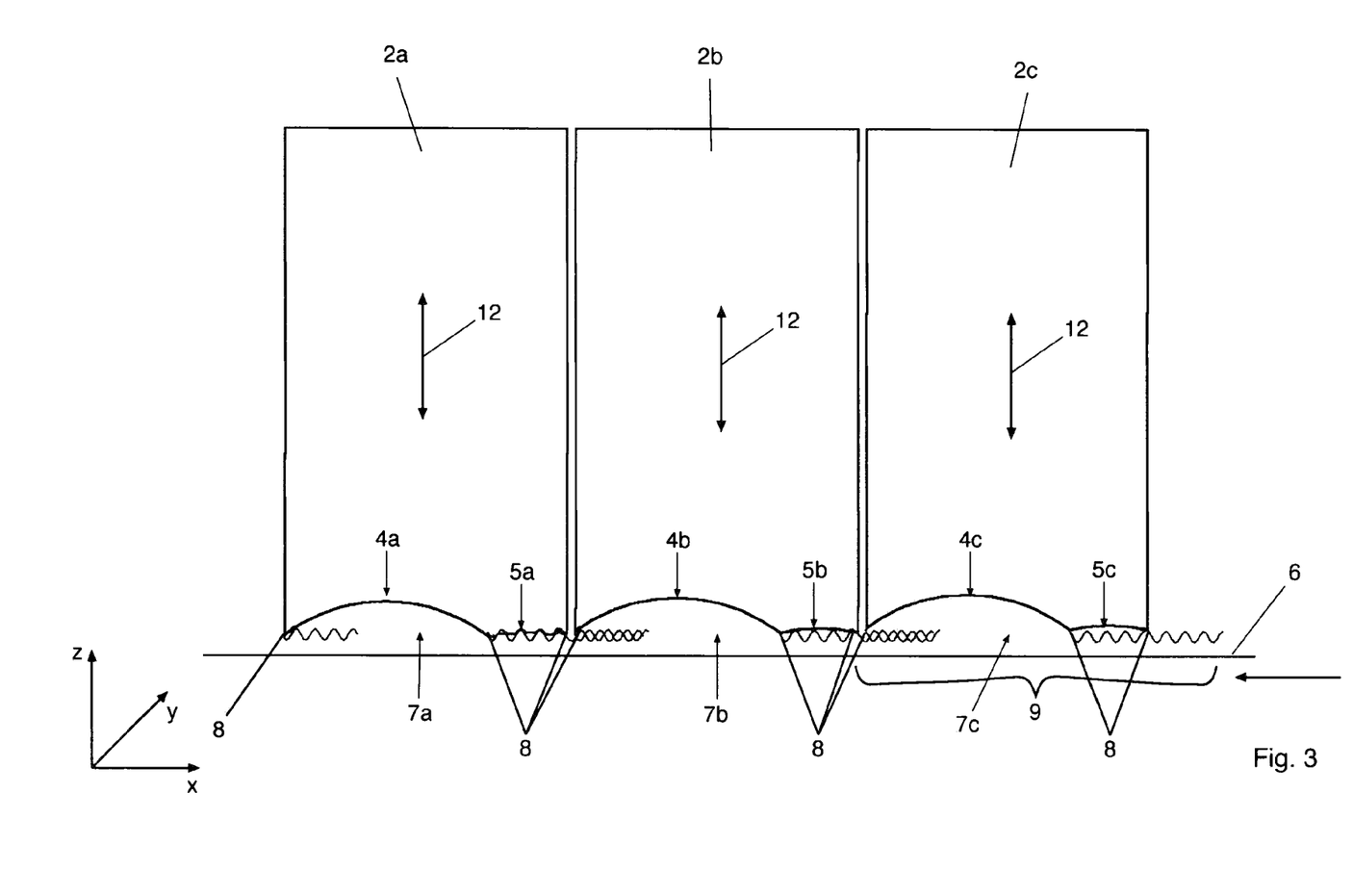

FIG. 3 shows a partially enlarged representation of the ends 7a, 7b and 7c of the compressor elements 2a, 2b and 2c. This representation corresponds to a side view or a sectional representation of the compressor elements 2a, 2b and 2c. In the example of FIG. 3, the compressor elements 2a, 2b and 2c and their respective movement direction 12 are parallel. As can be seen in the enlarged representation of the ends 7a, 7b and 7c, these each have a first structure 4 and a second structure 5. The structures 4 and 5 are each designed with a concave shape, with the structures 4 and 5 differing in their size and their radius. The compression of the particulate construction material preferably takes place at the contact points 8 formed by the structures 4 and 5. The compressor elements 2a, 2b and 2c can move in the directions depicted with the double arrows, while the construction site 6 is moved, for example, in the direction shown by the arrow, in FIG. 3 to the left.

FIG. 3 shows at each of the contact points 8 is a curve with a wavy shape. This curve is intended to illustrate the course of the movement of the contact points 8 over a corresponding time window, and over the construction site 6. This course arises from the superimposition of the reciprocating movement of the compressor elements 2a, 2b and 2c (double arrow) and the traversing movement (single arrow) of the construction site 6. The depicted waveform thus represents the compression process on the surface of the construction site 6 and shows that the particulate construction material is compressed simultaneously with a compressor element 2a, 2b and 2c at three different points or contact points 8.

By moving the construction site 6, for example, in the direction shown in the FIG. 3, a region 9 on the surface of the construction site 6 is first compressed several times by three contact points 8 of the compressor element 2c due to the reciprocating movement of the compressor element 2c in its movement direction 12. Thus, multiple compression already occurs by way of a compressor element 2c, in the example at three different contact points 8 within the region 9.

This region 9 is subsequently reached by the compressor element 2b. Multiple compression of the particle-shaped construction material also takes place by the three contact points 8 of the compressor element 2b in the region 9. After the compressor element 2b has traversed the region 9, the compressor element 2a reaches the region 9. Multiple compression of the particulate construction material in the region 9 occurs likewise by the three contact points 8 of the compressor element 2a. Thus, the particles 11 of the particulate construction material been compacted several times in the region 9, allowing a fast and solid layer-by-layer buildup of the 3D structure.

Figure 4:
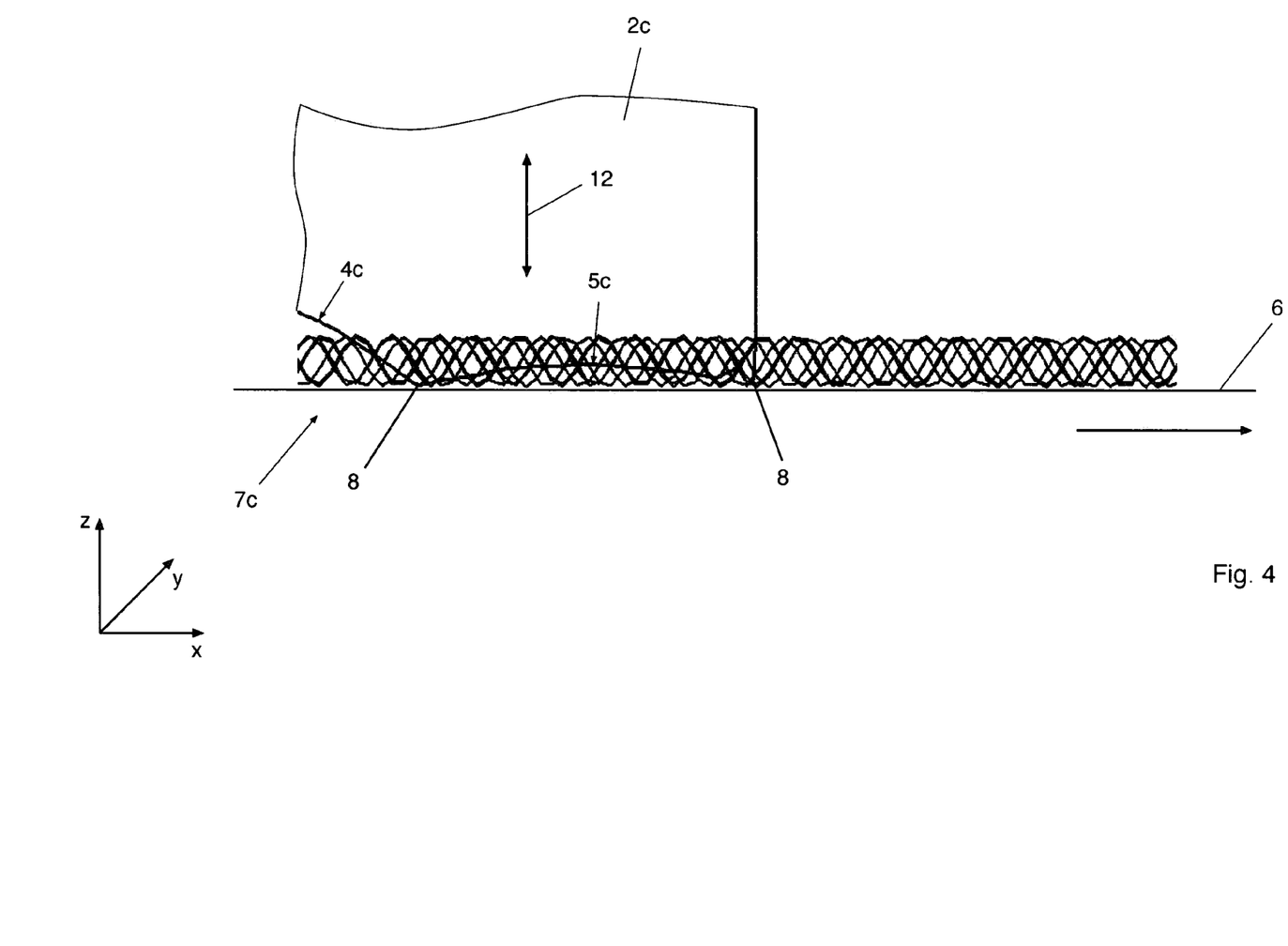
FIG. 4: a further partial enlarged view of an end of a compressor element.

FIG. 4 shows, by way of example, a further, partially enlarged representation of an end 7c of a compressor element 2c with two contact points 8. The end 7c of the compressor element 2c has a first concave structure 4c, which is only partially shown. The end 7c also has a second concave structure 5c, which has a larger radius than the first concave structure 4c.

FIG. 4 further shows a construction site 6 which is moved or traversed underneath the compressor element 2c in the direction indicated by the arrow. The compression operation of the unillustrated particulate construction material on the surface of the construction site 6 by the two illustrated contact points 8 and by the unillustrated contact points 8 is illustrated by way of several wavy curves across the surface of the construction site 6. In addition to the two illustrated contact points 8 of the compressor element 2c, the unillustrated contact point 8 of the compressor element 2c as well as the unillustrated contact points 8 of the compressor elements 2a and 2b also participate in the compression process.

Figure 5A:
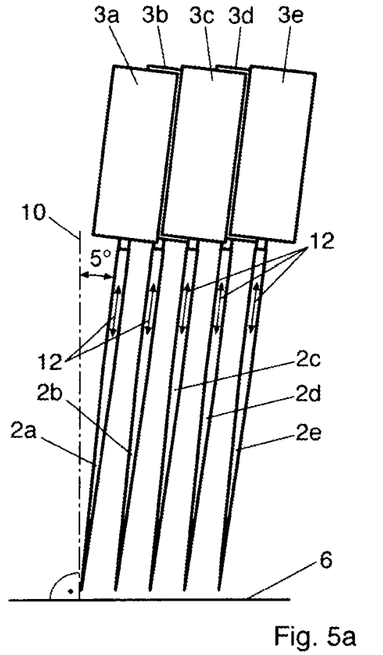
FIG. 5a: an embodiment with five mutually parallel compressor elements having an orientation of the compressor elements above the construction site deviating from a surface normal.

FIG. 5a shows an embodiment of the invention with five mutually parallel compressor elements 2a, 2b, 2c, 2d and 2e. In this variant, the compressor elements 2a, 2b, 2c, 2d and 2e are arranged so as to deviate from a surface normal 10 above the construction site 6 at an angle of, for example, 5 degrees relative to the surface normal 10.

The blades of the cutting edges of the compressor elements 2a, 2b, 2c, 2d and 2e are designed with a V-shaped bevel disposed, for example, at the respective end of the respective compressor element 2a, 2b, 2c, 2d and 2e. The compressor elements 2a, 2b, 2c, 2d and 2e are connected with their associated drive means 3a, 3b, 3c, 3d and 3e (not shown in FIG. 5a) and are moved by these drive means in a linear movement direction 12 parallel to each other with the above-described linear reciprocating motion. The movement directions 12 of the compressor elements 2a, 2b, 2c, 2d and 2e are shown in FIG. 5a by the five double arrows.

Figure 5B:
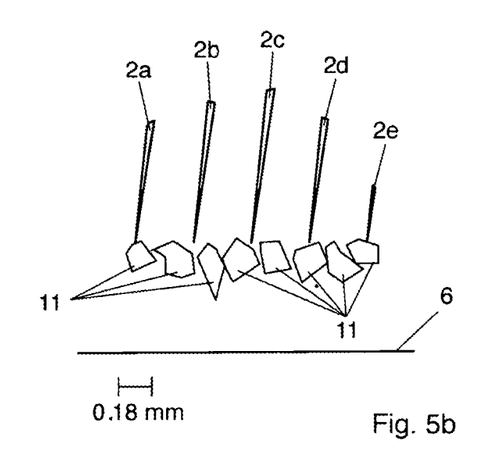
FIG. 5b: an enlarged view of the region of the ends of the five compressor elements according to FIG. 5a, FIG. 6a: an alternative embodiment with three compressor elements having various angles arranged above the construction site.

FIG. 5b shows an enlarged representation of the region of the ends of the compressor elements 2b 2c 2a, 2d and 2e according to FIG. 5a. In this representation of FIG. 5b, several particles of the particulate construction material 11 are shown in a plane above the construction site 6. As can be clearly seen, the width of a cutting edge of a compressor element 2a, 2b, 2c, 2d and 2e disposed at the end of the cutting edge which is in contact with the particles 11 of the during the compression process is selected to be smaller than the diameter of a particle 11 of the particulate construction material. As a result, a cutting edge of a compressor element 2a, 2b, 2c, 2d and 2e can purposely compress a particle 11 while neighboring particles 11 of the particulate construction material remain unaffected by this compression operation. For comparison, a dimension of 0.18 mm is indicated in FIG. 5b, which corresponds for example approximately to the diameter of a particle 11 of the particulate material.

By a corresponding movement of the compressor assembly 1 across the construction site 6, a particle 11 is then compressed by all three cutting edges of the compressor element 2a, 2b, 2c, 2d and 2e. For this purpose, the traversing speed of the compressor assembly 1 across the construction site 6 and the frequencies of the signals for controlling the drive means 3a, 3b, 3c, 3d and 3e are selected and coordinated accordingly.

Arranging the compressor elements 2a, 2b, 2c, 2d and 2e at a corresponding angle (inclination) counteracts a displacement of the particles 11 of the particulate construction material above the construction site 6, for example, in a movement direction of the compressor assembly 1.

The angle of orientation of the compressor elements 2a, 2b, 2c, 2d and 2e over the construction site 6 can be made adjustable. Thus, the angle can be changed during operation.

The compressor elements 2a, 2b, 2c, 2d and 2e may also be arranged over the construction site 6 with different angles while maintaining the mutual spacing between the blades of the three cutting edges of the compressor elements 2a, 2b, 2c, 2d and 2e, which means that the mutual alignment of the compressor elements 2a, 2b, 2c, 2d and 2e to each other is no longer parallel. For example, an angle of 0 degrees may be selected for the compressor element 2a, an angle of 2 degrees for compressor element 2b, an angle of 4 degrees for the compressor element 2c, an angle of 6 degrees for the compressor element 2d, and an angle of 8 degrees for the compressor element 2e. This embodiment is not shown in the figures.

Figure 6A:
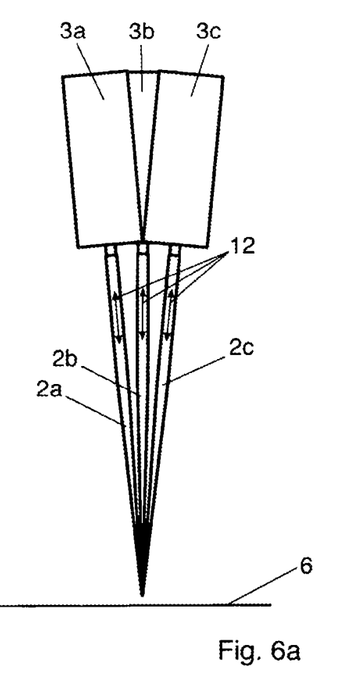

FIG. 6a shows an alternative embodiment with three compressor elements 2a, 2b and 2c, which are arranged at different angles over the construction site 6. In contrast to the illustration of FIG. 5a, the compressor elements 2a, 2b and 2c are not aligned parallel to one another. The compressor elements 2a, 2b and 2c in this embodiment are arranged such that the blades of the cutting edges of the compressor elements 2a, 2b and 2c have, for example, a V-shaped bevel and point to a common point. In this way, the cutting edges of all three compressor elements 2a, 2b and 2c can hit and compress a particle 11.

Figure 6B:
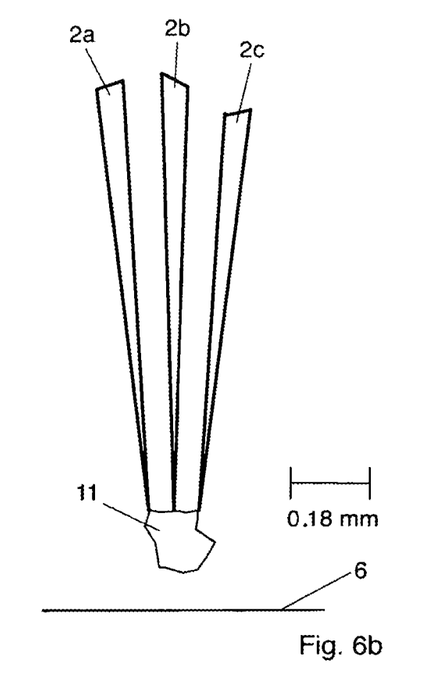

This situation is shown in FIG. 6b in an enlarged representation of the region of the cutting edges disposed at the ends of the compressor elements 2a, 2b and 2c. In such a case, where all three cutting edges hit a particle 11 of the particulate construction material, the compression may be produced, for example, by the second compressor element 2b, while the first compressor element 2a and the third compressor element 2c fix the particle at the current position. For comparison, a dimension of 0.18 mm is indicated in FIG. 6b. This dimension corresponds, for example, to the diameter of a particle 11 of the particulate material.

In addition, the compressor assembly 1 with the three compressor elements 2a, 2b and 2c may be inclined in order to counteract a movement of the compressor assembly 1 over the construction site 6. The particular advantages of the present arrangement and of the method for generating a 3D structure are listed below:

- The compressor elements perform a linear movement in the movement direction 12 for layer-by-layer compacting of the particulate construction material to be applied.
- The linear movement of the compressor elements can be at an adjustable angle with respect to the direction of travel of the construction site.
- The compressor elements can be arranged parallel to one another or at an angle to one another.
- Arrangement of several compressor elements in a compressor assembly, each with a separate drive means.
- Control of the drive means of the compressor elements with a selectable compressor frequency.
- Control of the drive means with a selectable curve shape of the voltage or the current driving the drive means.
- Design of the compressor elements with one or more structures disposed at the end of the compressor element, which is in contact with the particulate construction material during compression.
- Design of the structures with a convex, concave, sawtooth or wave shape.
- Application of the method for generating a 3D structure in the manufacture of casting cores, for example for producing cast components in the field of the facility and vehicle construction.
- By reducing the movable mass of a compressor element, the compressor element can be moved at a high frequency and, moreover, can compress the particles of the particulate construction material several times.
- The higher frequency during compression allows a greater traversing speed, for example of the construction site.
- Separating compression and application of the particulate construction material.
- Use of different structures for each compressor element to optimize the compression of the particulate construction material.

LIST OF REFERENCE NUMBERS

1 compressor assembly
2, 2a, 2b, 2c, 2d, 2e compressor element
3, 3a, 3b, 3c, 3d, 3e drive means
4, 4a, 4b, 4c first structure
5, 5a, 5b, 5c second structure
6 construction site
7, 7a, 7b, 7c end of the compressor element
8 contact point
9 region
10 surface normal
11 particles of the particulate construction material
12 movement direction of the compressor element (linear, along longitudinal axis)

The invention claimed is:

1. An arrangement for generating a 3D structure, comprising a compressor assembly (1) with a compressor element (2) for point-by-point compression a non-solidified particulate construction material to be applied layer-by-layer and a driver (3) connected to the compressor element (2) and imparting on the compressor element (2) a linear movement, wherein the compressor element (2) having at least one cutting edge is arranged in the compressor assembly (1) for compressing the non-solidified particulate construction material to be applied layer-by-layer, and wherein the width of a cutting edge disposed at one end of the cutting edge, which during the compression process is in contact with particles (11) of the non-solidified particulate construction material, is in a range between about 0.01 mm and about 0.6 mm.

2. The arrangement according to claim 1, wherein the width of a cutting edge is preferably in a range between 0.03 mm and 0.4 mm.

3. The arrangement according to claim 1, wherein the driver (3) is one of an electrically or electromagnetically or piezoelectrically or electro-hydraulically or pneumatically driven.

4. The arrangement according to claim 1, wherein the compressor element (2) is arranged for movement above a surface of a construction site (6) on which a layered structure of the 3D structure (1) is to be created.

5. The arrangement according to claim 1, wherein a plurality of compressor elements (2) each having at least one cutting edge are arranged in the compressor assembly (1).

6. The arrangement according to claim 5, wherein the compressor elements (2) are arranged parallel to each other at an identical angle or at respective different angles in relation to a construction site (6).

7. The arrangement according to claim 1, wherein at least one structure (4, 5) is arranged at an end (7) of the compressor element (2); wherein the at least one structure (4, 5) has a concave shape.

8. A method for creating a 3D structure, comprising the steps of:
providing a layer of non-solidified particulate construction material to be applied over a construction site (6), wherein the non-solidified particulate construction material applied layer-by-layer is at least partially compacted and the 3D structure is created by a partial physical or chemical hardening process or a melting process,
point-by-point compressing the non-solidified particulate construction material applied layer-by-layer using a compressor element (2) arranged in a compressor assembly (1) having at least one cutting edge, wherein a width of a cutting edge disposed at one end of the cutting edge, which during a compression process is in contact with particles (11) of the non-solidified particulate construction material, is in a range between 0.01 mm and 0.6 mm; and
imparting on the compressor element (2) a linear movement (12) with a driver connected to the compressor element (2).

9. The method according to claim 8, wherein the movement of the compressor element (2) in the linear movement direction (12) occurs with an adjustable frequency and/or an adjustable frequency course.

10. The method according to claim 9, wherein the compressor element (2) comprises a plurality of compressor elements.

11. The method according to claim 10, wherein the plurality of compressor elements (2) are moved parallel to one another or at an angle with respect to one another.

12. The method according to claim 10, wherein the plurality of compressor elements (2) are moved parallel to one another, and perpendicular or different from a surface normal with respect to the construction site (6).

13. The method according to claim 10, wherein the plurality of compressor elements (2) are moved at a point in time in different movement directions (12).

14. An arrangement according to claim 2, wherein the width of a cutting edge is preferred to be in a range between 0.05 mm and 0.2 mm.

15. The arrangement according to claim 1, wherein the point-by-point compression comprises for each point compression of a single particle or two particles.

16. The method according to claim 8, wherein the width of a cutting edge is preferably in a range between 0.03 mm and 0.4 mm.

17. The method according to claim 8, wherein the width of a cutting edge is preferably in a range between 0.05 mm and 0.2 mm.

18. The method according to claim 8, wherein the compressor element (2) is arranged for movement above a surface of the construction site (6) on which a layered structure of the 3D structure (1) is to be created.

19. The method according to claim 8, wherein the point-by-point compressing comprises for each point compression of a single particle or two particles.

20. The arrangement according to claim 5, wherein the driver (3) and thus each of the compressor elements (2) are individually controllable with respect to at least one of frequency, amplitude, and wave shape.

21. The method according to claim 10, wherein the driver (3) and thus each of the plurality of compressor elements (2) are individually controllable with respect to at least one of frequency, amplitude, and wave shape.

22. The arrangement according to claim 1, wherein the at least one cutting edge is non-perpendicularly arranged relative to a surface normal above the construction site.

23. The method according to claim 8, wherein the at least one cutting edge is non-perpendicularly arranged relative to a surface normal above the construction site.

24. The arrangement according to claim 6, wherein an angle of alignment for each of the plurality of compressor elements (2) and thus the cutting edge is adjustable during operation.

25. The method according to claim 11, wherein an angle of alignment for each of the plurality of compressor elements (2) and thus the cutting edge is adjustable during operation.

* * * * *